United States Patent [19]

Kanda et al.

[11] Patent Number: 4,461,870
[45] Date of Patent: Jul. 24, 1984

[54] HIGH SOLID COATING COMPOSITION CONTAINING NOVEL MICROPARTICLES OF CROSSLINKED COPOLYMER INCLUDING AMPHOIONIC GROUPS

[75] Inventors: Kazunori Kanda, Yao; Keizou Ishii, Ashiya; Katsuaki Kida, Osaka; Shinichi Ishikura, Kyoto; Ryuzo Mizuguchi, Yahata, all of Japan

[73] Assignee: Nippon Paint Co., Ltd., Osaka, Japan

[21] Appl. No.: 460,878

[22] Filed: Jan. 25, 1983

[30] Foreign Application Priority Data

Jan. 27, 1982 [JP] Japan .................................. 57-13053
Jan. 27, 1982 [JP] Japan .................................. 57-13054

[51] Int. Cl.$^3$ ...................... C08L 75/00; C08L 67/08
[52] U.S. Cl. .................................... 525/123; 523/400;
523/436; 524/315; 524/376; 524/507; 524/512;
524/513; 524/522; 525/28; 525/30; 525/44;
525/63; 525/70; 525/78; 525/108; 525/161;
525/162; 525/163
[58] Field of Search ........................ 525/28, 30, 44, 63,
525/70, 78, 108, 123, 161, 162, 163; 523/400,
436; 524/507, 512, 513, 522

[56] References Cited

U.S. PATENT DOCUMENTS

| 4,116,912 | 9/1978 | Mizuguchi et al. | 524/816 |
| 4,309,327 | 1/1982 | Ishikura et al. | 524/814 |
| 4,336,177 | 6/1982 | Backhouse et al. | 525/902 |
| 4,368,287 | 1/1983 | Ishikura et al. | 524/814 |

Primary Examiner—Theodore E. Pertilla
Attorney, Agent, or Firm—Wenderoth, Lind & Ponack

[57] ABSTRACT

A high solid coating composition comprising
(A) a film-forming polymer having functional group(s) capable of reacting with the crosslinking agent (D) hereinafter referred to,
(B) a volatile organic liquid diluent in which the polymer (A) is carried,
(C) polymer microparticles having an average diameter of from 0.02 to 40 microns, which are insoluble in the combination of the film-forming polymer (A) and the diluent (B) and are maintained in a stabilized state of dispersion therein, and
(D) a crosslinking agent dissolved in the diluent (B), which is characterized in that the microparticles (C) are composed of crosslinked copolymer of α,β-ethylenically unsaturated monomers carrying thereon a resinous portion having an amphoionic group of the formula:

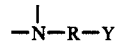

wherein R is a member selected from optionally substituted alkylene having 1 to 6 carbon atoms and phenylene group and Y is —COOH or —SO$_3$H.

3 Claims, No Drawings

HIGH SOLID COATING COMPOSITION CONTAINING NOVEL MICROPARTICLES OF CROSSLINKED COPOLYMER INCLUDING AMPHOIONIC GROUPS

FIELD OF INVENTION

The present invention relates to a high solid coating composition having contained therein novel polymeric microparticles, which is particularly useful as decorative coating for automobile bodies and other articles.

BACKGROUND OF INVENTION

Recently, a high solid coating composition comprising crosslinked polymeric microparticles dispersed in a conventional coating composition containing film-forming resinous vehicle, has been watched with keen interest in various coating areas, and especially in an automobile industry, because of the eminent workability and capability of resulting a coating with excellent film performance.

These particles are composed of polymer crosslinked to the extent that it is insoluble in an organic solvent in which the particles are dispersed, finely pulverized to micron size, and stably dispersed in the coating composition. Dispersion of said microparticles in a solvent or a carrying vehicle is sometimes called, for convenience, as "microgels".

In preparing such microgels, various methods have been proposed. One of the methods proposed comprises the combination of steps of preparing fine particles of polymer by emulsion polymerization technique from ethylenically unsaturated monomer and other crosslinkable, polymerizable monomer in an aqueous medium, and separating thus formed microgel particles from the reaction system by solvent replacement, azeotropic distillation, centrifugal separation, filtering, drying and other means. Another one is the so-called NAD (non-aqueous dispersion) method comprising reacting monomer having an ethylenical unsaturation and other copolymerizable crosslinking monomer in a non-aqueous organic solvent which may dissolve monomers but not the formed polymer, and separating thus formed polymer fine particles therefrom.

For industrial purposes, much preference is given to the former because the formation of fine particles and the removal of reaction heat can be easily done. However, in that method, one extra step is always required to remove water from the formed emulsion. Furthermore, since a comparatively low molecular compound, mainly of anionic or cationic surfactant, is customarily used as an emulsifier for assisting effective dispersion of monomers in an aqueous medium and this is always carried, by adhesion, on the surfaces of polymer particles, the same is, when coated, necessarily contained in the coating, exerting harmful effects on the film performance with respect to water resistance and the like. In addition, in the emulsion polymerization step, an aqueous medium is used, whereas in the formulation of coating composition, (a) volatile organic solvent (s) as aromatic hydrocarbons, is(are) customarily used. Since it is quite difficult to use the emulsifier already used in the emulsion polymerization step for for assistance in the dispersion of monomers in an aqueous medium, direct use of microparticles in the subsequent formulation step to obtain a stable dispersion thereof in a different environment i.e., an organic solvent, requires special steps to obtain the stable dispersion of said microparticles in the coating composition. On the other hand, in the NAD method, use is made of a non-aqueous organic solvent which will scarcely dissolve the polymer in it. Therefore, the thus formed product may be directly added to the coating composition. Or even if the separation of microparticles is to be desired, it may be easily done by mere adoption of simple filtering means. However, this NAD method introduces various problems inherent thereto and differing from those of the emulsion polymerization method. First of all, this method requires a particular type of dispersion stabilizing agent in the copolymerization of ethylenically unsaturated monomer and crosslinkable, copolymerizable monomer in a non-aqueous organic medium to obtain microgels. Usually, said stabilizing agent is a graft copolymer comprising a polymer backbone which is non-solvatable by the reaction medium of organic liquid, and a plurality of solvatable polymer chains pendant from the backbone. However, actual selection of said graft copolymer has to be made very carefully in due consideration of affinity for the polymer particles as well as affinity for the solvent, depending on the types of monomers and of the non-aqueous organic solvent used. Furthermore, since a low polarity liquid solvent mainly composed of aliphatic hydrocarbons is used as an organic liquid in the preparation of microgels and a relatively highly polar organic solvent is used in the formulation of coating composition, the dispersion stabilizing agent used in the microgel formation step is almost useless for the stabilization of microgels in the coating composition. As a solution to this problem, laid Open Japanese Patent Application Nos. 133234/78, 133235/78, 133236/78, and 150439/79 suggest that after formation of microgels, particular monomers capable of forming polymer having the same composition as that of the film-forming polymer used in the coating composition are polymerized on the surfaces of said microgel particles, thereby effecting modification of polymer surfaces so as to accomodate themselves to the different circumstances. Thus, there are various problems in heretofore known methods for the preparation of microgels and high solid coating compositions using the same and no satisfactory solutions have been found yet.

Under the circumstances, it would be an immeasurable advancement of the technical level concerned if one could provide microgels accompanied by no harmful component and capable of admixing with a coating composition without the necessity of adopting any special after treatment or using a particular type of stabilizing agent.

SUMMARY OF INVENTION

An object of the present invention is, therefore, to provide microparticles of polymer that are easily prepared without using any harmful emulsifier or stabilizing agent and are directly added to a coating composition as they are. Another object is to provide a high solid coating composition containing said microparticles of polymer in a stabilized state of dispersion therein, which is excellent in workability and is particularly useful as decorative coating for automobile bodies and other articles. The other objects of the invention will be apparent from the description of the specification and accompanying claims.

The invention, thus, provides a high solid coating composition comprising (A) a film-forming polymer having functional group capable of reacting with that of crosslinking agent (D) hereinafter referred to, (B) a volatile organic liquid diluent in which the polymer (A) is carried, (C) polymer microparticles having an average diameter of from 0.02 to 40 microns, which are insoluble in the combination of the film-forming polymer (A) and the diluent (B) and are maintained in a stabilized state of dispersion therein, and (D) a crosslinking agent dissolved in the diluent (B), which is characterized by the fact that the microparticle polymer is a crosslinked copolymer of α,β-ethylenically unsaturated monomers, carrying a resinous portion having an amphoionic radical of the formula:

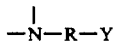

wherein R is a member selected from optionally substituted, alkylene having 1 to 6 carbon atoms and phenylene groups, and Y is —COOH or —SO₃H.

DESCRIPTION OF SPECIFIC EMBODIMENTS

The film-forming polymer constituent (A) of the composition of this invention may be any polymer known to be useful in coating compositions, providing that it has a functional group which is able to react with that of the crosslinking agent hereinafter referred to. Examples of such polymers are acrylic, alkyd and polyester resins bearing such functional groups as hydroxyl and carboxyl groups. Usually, they have an acid value of 0.5 to 60, hydroxyl number of 20 to 200 and number average molecular weight of 500 to 10,000.

To attain or promote hardening of said polymer (A), a crosslinking agent (D) is compounded together. This may be any of the known crosslinking agents customarily used in the related field, providing that it is soluble in an organic liquid diluent (B) and is capable of reacting with abovementioned functional group of the film-forming polymer constituent (A). Appropriate members are, for example, diisocyanates, diepoxides and aminoplast resins. Particularly preferable ones are melamine-formaldehyde condensation products, substantial portions of whose methylol groups are etherized with butanol or methanol.

The abovesaid film-forming polymer (A) is carried in a volatile organic liquid diluent (B) in the form of dispersion or solution, or may be partly in dispersion and partly in solution, though the crosslinking agent (D) is necessarily dissolved therein. Examples of such volatile organic liquid diluents are aromatic hydrocarbons as toluene, xylene and petroleum fractions of various boiling point ranges having a significant aromatic content, esters as butyl acetate, ethylene glycol diacetate and 2-ethoxyethyl acetate, ketones as acetone and methyl isobutyl ketone, and alcohols as butyl alcohol. Besides the abovementioned film-forming polymer constituent (A), crosslinking agent (D) and volatile organic liquid diluent (B), the coating composition of this invention, as the most characteristic feature thereof, contains novel polymer microparticles (C) hereinunder defined.

The polymer microparticles (C) present in the composition of the invention are composed of crosslinked copolymer of α,β-ethylenically unsaturated monomers, carrying a resinous portion having an amphoionic radical of the formula:

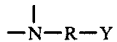

wherein R is a member selected from optionally substituted alkylene having 1 to 6 carbon atoms and phenylene groups, and Y is —COOH or —SO₃H.

They are insoluble in the combination of the film-forming polymer (A) and the diluent (B) because of the characteristic of crosslinking and are maintained in a stabilized state of dispersion in the coating composition because of the presence of a resinous portion having a dipolar ionic radical in that copolymer. They should preferably have an average diameter of from 0.02 to 40 microns. Such polymeric microparticles may be classified in the following two groups, for the mode of inclusion of said resinous portion having the ampho ionic radical in the constituting copolymer.

(I) The first group of polymeric microparticles is composed of crosslinked copolymer of α,β-ethylenically unsaturated monomers, having physically adhered thereon a polymeric resin having an ampho ionic radical of the formula

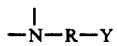

Fine particles of crosslinking type acrylic polymer may be advantageously prepared by the copolymerization of at least one α,β-ethylenically unsaturated monomer and at least one crosslinking monomer which is difunctional with respect to the polymerization reaction, in an aqueous or organic solvent.

As the α,β-ethylenically unsaturated monomers, mention is made of the following.

(1) carboxyl bearing monomers as, for example, acrylic acid, methacrylic acid, crotonic acid, itaconic acid, maleic acid and fumaric acid, (2) hydroxyl bearing monomers as, for example, 2-hydroxyethyl acrylate, hydroxypropyl acrylate, 2-hydroxyethyl methacrylate, hydroxypropyl methacrylate, hydroxybutyl acrylate, hydroxybutyl methacrylate, allyl alcohol and methally alcohol, (3) nitrogen containing alkyl acrylates or methacrylates as, for example, dimethylamino ethyl acrylate, and dimethylaminoethyl methacrylate, (4) polymerizable amides as, for example, acrylic amide and methacrylic amide, (5) polymerizable nitriles as, for example, acrylonitrile and methacrylonitrile, (6) alkyl acrylates or methacrylates as, for example, methyl acrylate, methyl methacrylate, ethyl acrylate, n-butyl acrylate, n-butyl methacrylate, and 2-ethylhexyl acrylate, (7) polymerizable aromatic compounds as, for example, styrene, α-methyl styrene, vinyl toluene and t-butyl styrene, (8) α-olefins as, for example, ethylene and propylene, (9) vinyl compounds as, for example, vinyl acetate and vinyl propionate,

(10) diene compounds as, for example, butadiene and isoprene, and the like.

These monomers are used alone or in combination. Crosslinking monomers may be any of the known monomers of functionality greater than two. Preferable group members are the so-called polyfunctional monomers having two or more ethylenical unsaturations in its molecule such as polymerizable unsaturated monocarboxylic esters of polyhydric alcohol, polymerizable unsaturated alcoholic esters of polycarboxylic acid and aromatic compounds substituted with more than 2 vinyl groups. Examples of such members are ethylene glycol diacrylate, ethylene glycol dimethacrylate, triethylene glycol dimethacrylate, tetraethylene glycol dimethacrylate, 1,3-butylene glycol dimethacrylate, trimethylolpropane triacrylate, trimethylolpropane trimethacrylate,1,4-butanediol diacrylate, neopentyl glycol diacrylate, 1,6-hexanediol diacrylate, pentaerythritol diacrylate, pentaerythritol triacrylate, pentaerythritol tetra acrylate, pentaerythritol dimethacrylate, pentaerythritol trimethacrylate, penta erythritol tetramethacrylate, glycerol diacrylate, glycerol dimethacrylate, glycerol allyloxy dimethacrylate, 1,1,1-tris-hydroxymethylethane triacrylate, 1,1,1-trishydroxymethylethane dimethacrylate, 1,1,1-tris-hydroxy methylethane trimethacrylate, 1,1,1-tris-hydroxymethylpropane diacrylate, 1,1,1-tris-hydroxymethylpropane triacrylate, 1,1,1-tris-hydroxymethylpropane dimethacrylate, 1,1,1-trishydroxymethyl propane trimethacrylate, triallyl cyanurate, triallyl isocyanurate, triallyl trimellitate, diallyl terephthalate, diallyl phthalate and divinyl benzene.

Crosslinking monomers may also be of the combination of two ethylenically unsaturated monomers each bearing mutually reactive functional group as, for example, the combination of epoxy bearing ethylenically unsaturated monomers, such as glycidyl acrylate and glycidyl methacrylate, and carboxyl bearing ethylenically unsaturated monomers, such as acrylic acid, methacrylic acid and crotonic acid. Other examples of combination of mutually reactive functional groups are amine and carbonyl, epoxide and acid anhydride, amine and acid chloride, alkyleneimine and carbonyl, organoalkoxysilane and carboxyl, hydroxyl and isocyanate, and the like.

These α,β-ethylenically unsaturated monomers and crosslinking monomers are reacted in an aqueous or organic liquid medium in a conventional way to obtain microparticles of crosslinked copolymer. However, in the present invention, the polymerization is carried out in the presence of a resin having an ampho ionic radical of the formula:

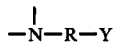

(in which R and Y are as defined above)

Examples of such resins are alkyd, polyester, modified epoxy, acrylic, melamine and polyether resins having the amphoionic group of the formula:

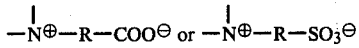

These resins can exhibit specific behaviors in regard to reactivity, surface activity, and electrochemical properties because of the presence of said amphoionic radical, and are very useful as emulsifier or stabilizing agent in that polymerization reaction. Alkyd resin and polyester resin are characterized by forming a series of ester chains using an essential components polycarboxylic acid and polyhydric alcohol. Therefore, when a part of said polyhydric alcohol is replaced by, for example, a compound of the formula:

wherein $R_1$ represents an alkyl having at least one hydroxyl group, $R_2$ and $R_3$ are the same or different, each represents hydrogen or optionally substituted alkyl group, and A represents optionally substituted alkylene having 1 to 6 carbon atoms or phenylene group, it is possible to obtain alkyd or polyester resin having the abovesaid amphoionic group in its molecule. Reference may be made in this connection to Japanese Patent Applications of Nippon Paint Co., Ltd, Nos. 110865/79 and 56048/80 (Kokai Nos. 34725/811 51727/81), filed on Aug. 30, 1979 and Apr. 26, 1980, respectively.

Among these resins, the members having an acid vale of 30 to 150, and especially 40 to 150, and number average molecular weight of 500 to 5000, and especially 700 to 3000 are preferably used in this invention.

Modified epoxy resins having the characteristic amphoionic radical of the formula:

are stated, for example, in Japanese Patent Application of Nippon Paint Co., Ltd, No. 116293/80, filed on Aug. 22, 1980 (now laid open as Kokai No. 40522/82) In general, epoxy resin is characterized by having at the end of the polymer chain a group of the formula:

wherein $R_4$ and $R_5$ each represents hydrogen or methyl group. Therefore, it is possible to obtain a modified epoxy resin having at the end of polymer chain a quantity of such radical as

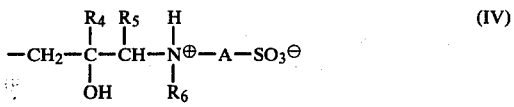

by the reaction of said epoxy resin with a compound of the formula:

wherein $R_6$ is an alkyl group optionally substituted with a radical incapable of reacting with epoxy group, M stands for alkali metal or ammonium, and A has the same meaning as defined above. In proportion to the quantity of said amphoionic groups, the hydrophilic property of the modified epoxy resin will increase. Reference may be made in this connection to Japanese Patent Application of Nippon Paint Co/. Ltd, No. 116293/80, filed on Aug. 22, 1980 (now laid open as Kokai No. 40522/82).

An acrylic resin having in its molecule a radical of the formula:

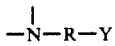

can be advantageously prepared by a solution polymerization using a free radical initiator from the combination of at least one polymerizable amino acid compound selected from

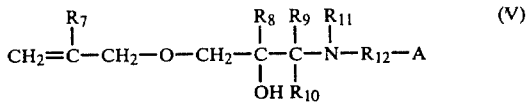

wherein $R_7$, $R_8$, $R_9$ and $R_{10}$ each represents a member selected from the group consisting of H, $CH_3$ and $C_2H_5$, $R_{11}$ is hydrogen or alkyl having 1 to 20 carbon atoms optionally including in its chain either one of —SO—, —COO— and —O— groups, $R_{12}$ represents alkylene group having 1 to 12 carbon atoms, optionally substituted with —OH, —SH, —$SR_{13}$ (in which $R_{13}$ is alkyl having 1 to 4 carbon atoms) or one or more of alkyl having 1 to 4 carbon atoms, and A represents COOH or $SO_3H$ group;

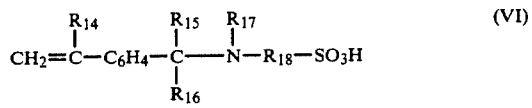

wherein $R_{14}$, $R_{15}$ and $R_{16}$ each represents H or alkyl having 1 to 6 carbon atoms, $R_{17}$ represents hydrogen or alkyl having 1 to 20 carbon atoms, optionally including in its chain either one of —SO—, —COO— and —O— group, or $R_{17}$ represents a radical of the formula:

$R_{18}$ represents alkylene having 2 to 12 carbon atoms, optionally substituted with one or more of alkyl groups having 1 to 6 carbon atoms;

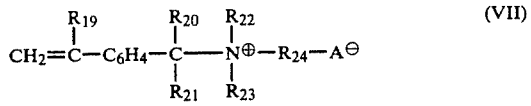

wherein $R_{19}$, $R_{20}$ and $R_{21}$ are the same or different and each represents H or $CH_3$, $R_{22}$ represents $C_1 \sim C_{20}$ alkyl having at least one hydroxyl group and optionally containing in its alkyl structure a group of —O— or —COO—, $R_{23}$ represents $C_1 \sim C_{20}$ alkyl having at least one hydroxyl group and optionally containing in its alkyl structure a group of —O— or —COO—, or H or $C_1 \sim C_{20}$ alkyl, $R_{24}$ represents optionally substituted $(CH_2)\eta$ (in which $\eta$ is an integer of from 1 to 6), and A is COO or $SO_3$; and

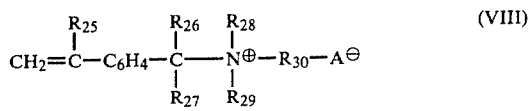

wherein $R_{25}$, $R_{26}$ and $R_{27}$ are the same or different and each represents H or $CH_3$, $R_{28}$ and $R_{29}$ are the same or different and each represents $C_1 \sim C_{20}$ alkyl optionally containing —O— or —COO—, or cycloalkyl group, or $R_{28}$ and $R_{29}$ taken together may form a hetero ring containing nitrogen atom, $R_{30}$ represents optionally substituted $(CH_2)\eta$ alkylene in which $\eta$ is an integer of from 1 to 6, and A is COO or $SO_3$, and at least one polymerizable monomer selected from hydroxy bearing monomers, carboxyl bearing monomers, glycidyl bearing monomers, alkyl acrylates or methacrylates, N-containing alkyl acrylates or methacrylates, polymerizable amides, polymerizable nitriles, polymerizable aromatic compounds, α-olefins, vinyl compounds and diene compounds already stated hereinbefore. As to the details of these polymerizable amino acid compounds, reference should be made to Japanese Patent Applications of Nippon Paint Co., Ltd, Nos. 123899/78 (Kokai No. 51050/80), 125996/78 (Kokai No. 53251/80), 47651/80 (Kokai No. 145249/81) and 47652/80 (Kokai No. 145250/81), and as to amphor ionic radical bearing acrylic resin, to Japanese Patent Application of Nippon Paint Co.,Ltd, No. 71864/81 filed on May 12, 1981.

Preferably, these acrylic resins should have an acid value of 30 to 180, most preferably 40 to 160, and number average molecular weight of 500 to 10,000, and most preferably 700 to 6000.

Melamine resins having

radical may be prepared by using at least one hydroxyl bearing aminosulfonic type amphoionic compound represented by the formula:

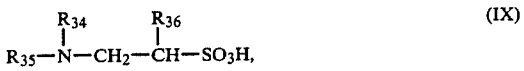

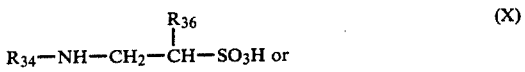

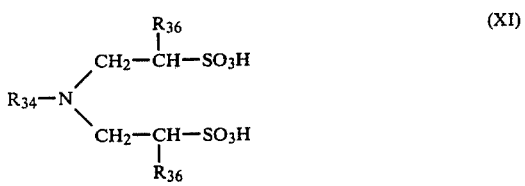

wherein $R_{34}$ represents $C_1 \sim C_{20}$ hydroxyalkyl optionally containing in alkyl structure a groop of —O— or —COO—, $R_{35}$ has the same meaning with $R_{34}$ or represents lower alkyl, and $R_{36}$ represents H or methyl group, together with melamine and formaline and following the conventional means. The reaction conditions and procedures used are not of a specific, nature and in this connection, reference should be made to, for example, "A guide of synthetic resins for coating composition" by K. Kitaoka, published on May 25, 1974, Kobunshi Kankokai, pages 134 to 139. The abovesaid hydroxy bearing aminosulfonic type amphoionic compounds are described in more minute detail in Japanese Patent Application by Nippon Paint Co.,Ltd, No. 170624/79 (now laid open as Kokai No. 92859/81).

Polyether resins having

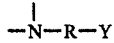

group may be prepared, as stated in Japanese Patent Application No. 116293/80 (Kokai No. 40522/82) filed on Aug. 22, 1980, by Nippon Paint Co., Ltd, by reacting a compound of the formula:

$$R_{33}-NH-A-SO_3M \quad (XIII)$$

wherein $R_{33}$ is a substituent incapable of reacting with epoxy group, A represents an alkylene or phenylene, and M stands for alkali metal or ammonium group, to a polyether type epoxy resin having at the end of the polymeric chain a group of the formula:

wherein $R_{31}$ and $R_{32}$ each represents hydrogen or methyl group, thereby obtaining a modified polyether type epoxy resin having at the end of polymeric chain a group of the formula:

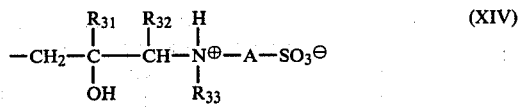

Various polyether type epoxy resins are commercially available. All of the abovementioned resins do possess in their molecule a characteristic ampho-ionic group of

and may be prepared either as water soluble type or as an organic solvent soluble type. When selecting a water soluble type resin, this is quite useful as emulsifiers and dispersing agent in an emulsion polymerization of $\alpha,\beta$-ethylenically unsaturated monomers in an aqueous medium and therefore, without using any additional emulsifier, it is possible to prepare microparticles of crosslinked polymer employable in the present invention.

The polymerization may preferably and advantageously be carried out by adding a mixture of each defined amounts of monomers including crosslinking monomer, to an aqueous medium containing the abovesaid ampho-ionic type resin, in the presence of polymerization initiator. The amount of said ampho ionic type resin may vary within a comparatively wide range, and however, in general, it is in the order of 0.3 to 8%, and preferably 0.5 to 6%, by weight of the total amount of monomers to be copolymerized. The crosslinking monomer may constitute 0.01 to 20%, most preferably 0.1 to 10%, by weight of the total polymerization monomers, and however, this is not critical in the present invention. What is essential is to present the crosslinking monomer in the reaction system in sufficient quantity to make the microparticle polymer insoluble in the combination of film-forming polymer and organic liquid diluent. Usually, said insolubility of the microparticles may be checked by means of the following test. That is, the microparticles (1 part by weight) are shaken for 30 minutes with the organic liquid diluent (e.g. tetrahydrofuran) (100 parts by weight), the suspension is then centrifuged at 17,000 r.p.m. for 30 minutes. The supernatant liquid is decanted off and the residual polymer is dried and weighed. The weight of said polymer is compared with that of the microparticles originally taken. Where the result of this test indicates that the microparticles are acceptably insoluble in the diluent alone, it can be assumed that the particles will be at least equally insoluble in the combination of the film-forming polymer and the diluent.

The reaction medium, i.e. water, may be used in an amount so as to give a resinous emulsion of 2 to 65%, preferably 20 to 60%, non-volatile solid content. In order to assist the solubilization of said amphoionic resin, a quantity of basic material equivalent to the acid value may present in the reaction medium. As the basic materials, use can be made of alkali metal hydroxides, ammonia and organic amines, but for reason of volatile property and giving no residual inorganic ions in the formed coating, preference is given to ammonia or organic amine. The aqueous medium may also contain a water miscible organic solvent, if required.

As the polymerization initiator, any of the members known to be useful in the related technical field may satisfactorily be used including organic peroxides as benzoyl peroxide, t-butyl peroxide and cumene hydroperoxide, organic azo-compounds as azobiscyanovaleric acid, azobisisobutyronitrile, azobis-(2,4-dimethyl)-valeronitrile, and azobis-(2-amidinopropane)hydrochloride, inorganic water soluble radical initiators as potassium persulfate, ammonium persulfate, sodium persulfate and hydrogen peroxide, and redox type initiators comprising the combination of said inorganic water soluble radical initiator and sodium pyrosulfite, sodium hydrogen sulfite or bivalent Fe ion. They may be used each alone or in combination. Such initiator may be previously contained in the reaction medium or may be added to the reaction system simultaneously with the addition of constituent monomers. The amount of initiator is usually in a range of from 0.05 to 5%, preferably 0.1 to 3%, by weight of the total monomers to be copolymerized. If desired, a normal chain transfer agent as lauryl mercaptan, hexyl mercaptan and the like may be present in an appropriate amount.

By the adoption of said emulsion polymerization technique, a stably dispersed, milky or creamy resinous emulsion can be obtained, the average diameter of contained microparticles being in the range of from 0.02 to $0.5\mu$. When removing water from the emulsion by spray drying, solvent replacement, azeotropic distillation, centrifugal separation, filtering, drying and other appropriate means, a somewhat cohered polymeric mass having a maximum diameter of about $40\mu$ can be obtained, which, however, is never a fused mass. Such product may be used directly or after being pulverized as the microparticles in the present high solid coating composition. For the purpose of drying said emulsion, a spray drying is most preferred because of the ease of operation and the particle diameter obtainable therewith.

Alternatively, the polymeric microparticles used in the invention may be prepared in a non-aqueous organic solvent by the so-called NAD method using the resin having an amphoionic radical as dispersion stabilizing agent. In that method, there is used a low polarity organic solvent that can be dissolved the monomers but not the polymer, like aliphatic hydrocarbons as exemplified by hexane, heptane and octane.

As previously mentioned, the amphoionic type resins used in the invention may be of the organic solvent soluble type and for the reasons of specific surface activity and electrochemical properties possessed, they are useful as effective dispersing and stabilizing agents in such circumstances. The reaction initiator to be used, operational details and after treatment in regard to NAD method are well known in the art and hence no particular mention would be required thereon. It will be sufficient to say that even in NAD method, the polymeric particles having an average diameter of 1 to 40μ can be obtained.

In either method, $\alpha,\beta$-ethylenically unsaturated monomers and crosslinking monomers are successfully copolymerized in the presence of said amphoionic type resin, and without the necessity of using any additional emulsifier, and microparticles of polymer crosslinked to the extent that they are insoluble in the organic liquid diluent are obtained. Furthermore, thus formed microparticles are always accompanied, through physical adhesion, by the amphoionic type resin used, which has an excellent affinity to volatile organic liquid diluent to be used in the coating composition, and therefore, when added to the composition of film-forming polymer, crosslinking agent and organic liquid diluent, they can be maintained in a stabilized state of dispersion in that system.

(II) The second group of polymeric microparticles is composed of crosslinked copolymer of $\alpha,\beta$-ethylenically unsaturated monomers, having integrally incorporated therein a resinous portion having an ampho ionic radical of the formula:

wherein R and Y are as defined above.

More specifically this group of polymer microparticles are composed of crosslinked copolymer of $\alpha,\beta$-ethylenically unsaturated monomers, to which the resinous portions having the amphoionic radicals are anchored by covalent bonding.

As previously mentioned, a resin having an amphoionic radical of the formula:

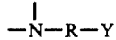

can exhibit specific reactivity and surface activity and hence is quite useful as an emulsifier or dispersing agent in the polymerization of $\alpha,\beta$-ethylenically unsaturated monomers in an aqueous or non-aqueous reaction medium. However, the microparticles obtained are composed of crosslinked polymer, on which surfaces the amphoionic type resins are merely held by physical adhesion. Insofar as the amphoionic type resins are anchored by that force, the particles may be maintained in a stabilized state of dispersion in the coating composition, but once the resins flow out of the microparticles for some reason, the stability of the microparticles would be greatly deteriorated.

The inventors have now surprisingly found that by the inclusion of polymerizable $\alpha,\beta$-unsaturation bonding in that amphoionic type resin, an additional role of anchoring of the resin to the microparticles can be attained, without sacrificing the desired properties and functioning of said resin.

Thus, in the second aspect of the invention, the polymeric microparticles (C) may be prepared by polymerizing at least one $\alpha,\beta$-ethylenically unsaturated monomer and at least one crosslinking monomer in an aqueous or organic medium in the presence of a resin having an amphoionic radical of the formula:

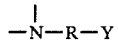

(wherein R and Y are as defined previously)

and a polymerizable $\alpha,\beta$-unsaturation bonding.

Examples of such resins are alkyd, polyester, modified epoxy, acrylic, melamine and polyether resins of the similar types as already stated in connection with the microparticles in paragraph (I). In the preparation of these ampho ionic type resins, it is vary easy to make them carry functional groups such as carboxyl or epoxy groups by the selective use of appropriate monomers to be copolymerized. The desired polymerizable $\alpha,\beta$-unsaturated bonding may, therefore, be freely introduced in the molecule of such resin, after having carried said amphoionic radical, by the reaction between the carboxyl bearing amphoionic type resin and epoxy bearing unsaturated compound such as glycidyl acrylate or glycidyl methacrylate, or the reaction between the epoxy bearing amphoionic type resin and $\alpha,\beta$-unsaturated carboxylic acid as acrylic acid, methacrylic acid, crotonic acid or the like.

More specifically, to the alkyd or polyester resin having an amino ionic group as already stated in the preceding paragraph (I), glycidyl acrylate or methacrylate may be reacted with the carboxyl groups still remaining therein, thereby incorporating a desired amount of polymerizable $\alpha,\beta$-unsaturated bonding to that resin.

To the modified epoxy resin having an ampho ionic group as stated in the preceding paragraph (I), $\alpha,\beta$-unsaturated carboxylic acid may be reacted with the remaining epoxy group.

In the case of acrylic resins, carboxyl or glycidyl bearing monomers may coexist in the reaction system for the preparation of amphoionic type acrylic resin stated in the preceding paragraph (I), and to the thus obtained resin, epoxy bearing unsaturated compounds such as glycidyl acrylate or methacrylate, or $\alpha,\beta$-unsaturated carboxylic acid as acrylic acid, methacrylic acid or crotonic acid may be reacted in a later stage. To the polyether resin having an ampho ionic group as stated in the preceding paragraph (I), acrylic or methacrylic acid may be used for the reaction with the remaining epoxy group. The invention however shall never be limited to the above and any modifications may be freely made in connection with the preparation of such resin having both amphoionic radicals and polymerizable $\alpha,\beta$-unsaturation bonding.

The resins can exhibit variegated affinities to aqueous and non-aqueous solvents because of the presence of the characteristic amphoionic group. Hydrophilic properties may be further increased by the inclusion of hydrophilic groups in the resin. Therefore, in the polymerization of $\alpha,\beta$-ethylenically unsaturated monomers, they can be used as an effective emulsifying or dispersion stabilizing agent in a system using either an aqueous or non-aqueous reaction medium. Furthermore, since they have the characteristic α,β-unsaturated bonding, they themselves can become involved in the copolymerization reaction thereby resulting the microparticles of crosslinked copolymer of α,β-ethylenically unsaturated monomers, to which an oligosoap having both resinous portion and amphoionic part of the formula:

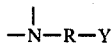

has been firmly anchored via covalent bonding.

Thus obtained microparticles are, therefore, maintained in stabilized state of dispersion in any medium including both aqueous and non-aqueous mediums and are quite useful as microparticle component (C) in the present high solid coating composition. Preparation of microparticles using this type of oligosoap is very similar to those as described in the preceding paragraph (1).

In the present invention, thus obtained microparticles are added to the film-forming polymer (A) organic liquid diluent (B) crosslinking agent (D) system to give a high solid coating composition. The compounding ratio of these four components may be freely varied in comparatively wide ranges depending on the application and the desired effect, and however, in general, 50 to 99.5 parts by weight of the film-forming polymer (in terms of solid content) are compounded with 50 to 0.5 parts by weight of the microparticles. The amount of crosslinking agent is, in general, 5 to 100 parts by weight per 100 parts of the aggregated weight of the film-forming polymer and the microparticles (i.e. polymeric components) and the amount of organic liquid diluent is about 10 to 2000 parts by weight per 100 parts of the aggregated weight of said polymeric components and the crosslinking agent (i.e. solid matters).

If desired, the coating composition of this invention may further contain other conventional additives such as antioxidants, UV-absorbers, surface modifiers, viscosity modifiers, pigments, metal flakes and the like. No specific techniques or apparatus are required for the preparation of the coataing composition of this invention.

The present coating compositions do possess an adequate fluidity for spray coating, and are able to make a thicker coating without the fear of sagging. The coatings exhibit high gloss and excellent film-performance. Since the compositions contain neither a low molecular weight emulsifying agent nor a graft polymer dispersing agent usually found in the conventional compositions, which agents may cause deterioration of film properties and because the coatings are only formed from the resinous material integrally crosslinked and hardened, from the abovesaid microparticles, film-forming polymer and crosslinking agent, they are quite useful as decorative coatings for automobile and other articles. This is due to the characteristics of the resulting films i.e., excellent durability and good appearance.

The invention shall be now more fully explained in the following Examples, which, however, should not be taken as being limitative in any sense. In these Examples, unless otherwise being stated, parts and % are by weight.

REFERENCE EXAMPLE 1

(a) Preparation of polyester resin having an amphoionic group:

Into a 2 liters flask fitted with stirrer, nitrogen inlet pipe, thermoregulator, condenser and decanter, were placed 134 parts of bishydroxyethyl taurine, 130 parts of neopentylglycol, 236 parts of azelaic acid, 186 parts of phthalic anhydride and 27 parts of xylene, and the mixture was heated, while removing the formed water azeotropically with xylene. The temperature was raised to 190° C. in about 2 hours from the commencement of reflux and stirring and dehydration were continued until the acid value reached 145. Then the reaction mixture was allowed to cool to 140° C. and while maintaining the same temperature, 314 parts of Cardura E-10 (glycidyl versatate, manufactured by Shell Chem. Co.) were added dropewisely in 30 minutes. After continuing stirring for 2 hours, the reaction was completed. The thus obtained polyester resin had an acid value of 59, hydroxyl number of 90 and number-average molecular weight of 1054.

(b) Preparation of polymer microparticles:

Into a 1 liter reaction vessel fitted with stirrer, condenser and thermoregulator, were placed 282 parts of deionized water, 10 parts of polyester resin obtained in the preceding paragraph (a) and 0.75 part of dimethylethanol amine, and the mixture was heated, while stirring, to 80° C. to get a clear solution. To this, were added 4.5 parts of azobiscyanovaleric acid dissolved in a combined solution of 45 parts of deionized water and 4.3 parts of dimethylethanolamine, and then dropwisely a mixture of 70.7 parts of methylmethacrylate, 94.2 parts of n-butyl acrylate, 70.7 parts of styrene, 30 parts of 2-hydroxyethyl acrylate and 4.5 parts of ethyleneglycol dimethacrylate was added over 60 minutes. After completion of said addition, a further 1.5 parts of azobiscyanovarelic acid dissolved in a combined solution of 15 parts of deionized water and 1.4 parts of dimethylethanolamine were added and the mixture was stirred at 80° C. for 60 minutes to obtain an emulsion having a solid content 45%, pH 7.2, viscosity 92 cps (25° C.) and particle diameter 0.156μ. The polymer microparticles were obtained by subjecting this emulsion to spray drying.

REFERENCE EXAMPLE 2

(a) Preparation of modified epoxy resin having an amphoionic group:

Into a similar reaction vessel as stated in Reference Example 1, were placed 73.5 parts of sodium salt of taurine, 100 parts of ethyleneglycol and 200 parts of ethyleneglycol monomethyl ether, and the mixture was stirred and heated to 120° C. to obtain a clear solution. To this, a mixture of 470 parts of Epon 1001 (bisphenol A diglycidylether type epoxy resin, epoxy equivalent 470, manufactured by Shell Chem. Co.) and 400 parts of ethyleneglycol monomethylether was added dropwise over 2 hours and stirring and heating were continued for 20 hours to complete the reaction. After purifying and drying the product, 518 parts of modified epoxy resin were obtained, whose acid value was 49.4 and sulfur content (fluorescent X ray analysis) was 2.8%.

(b) Preparation of polymer microparticles:

Into a stainless steel vessel, were placed 200 parts of deionized water and 0.2 part of triethylamine, and while stirring by means of mixer, were added 5 parts of modified epoxy resin obtained in the preceding paragraph (a), and the mixture was heated to 70° C. and stirred for 10 minutes to obtain a slightly turbid aqueous solution. Next, the abovesaid solution was placed in a similar reaction vessel as stated in Reference Example 1, added with 106 parts of deionized water and heated to 80° C. A mixed solution of 4.5 parts of azobiscyanovaleric acid, 4.9 parts of triethylamine and 45 parts of deionized water was added thereto and, while maintaining the same temperature, a mixture of 150 parts of methylacrylate, 142 parts of n-butyl acrylate, 1.8 parts of glycidyl methacrylate and 1.2 parts of methacrylic acid was added dropwise over 120 minutes. Thereafter, a solution of 1.5 parts of azobiscyanovaleric acid, 1.6 parts of triethylamine and 15 parts of deionized water was added while keeping the same temperature and the whole was stirred for 60 minutes to obtain an emulsion having a solid content 45%, pH 7.2, viscosity 69 cps (25° C.) and particle diameter $0.172\mu$. The polymer microparticles were obtained by subjecting the emulsion to spray drying.

REFERENCE EXAMPLE 3

Preparation of acrylic resin varnish:

Into a vessel fitted with stirrer, thermoregulator and reflux condenser, were placed 710 parts of toluene and 200 parts of n-butanol. To this, were added 200 parts of the following mixture:

| | |
|---|---|
| methacrylic acid | 12 parts |
| styrene | 264 parts |
| methyl methacrylate | 264 parts |
| n-butyl acrylate | 360 parts |
| 2-hydroxyethyl acrylate | 100 parts |
| azobisisobutylonitirle | 10 parts | and the content was stirred and heated. While refluxing, the remaining 810 parts of the abovesaid mixture were dropped in in 2 hours and then a solution of 3 parts of azobisisobutylonitrile in 100 parts of toluene was added in 30 minutes. Thereafter, the reaction mixture was further stirred and refluxed for 2 hours to complete the reaction, thereby obtaining an acrylic resin varnish having a solid content of 50%.

REFERENCE EXAMPLE 4

Preparation of alkyd resin varnish:

Into a reaction vessel fitted with a stirrer, thermoregulator and decanter, were placed the following:

| | |
|---|---|
| dehydrated castor oil | 260 parts |
| coconut oil | 192 parts |
| trimethylol propane | 403 parts |
| diethyleneglycol | 65 parts |
| phthalic anhydride | 578 parts |
| xylene | 45 parts | and the mixture was stirred and heated, while removing the formed water azeotropically with xylene. At the time when the acid value and hydroxyl number reached 10 and 100, the reaction was stopped, and the product was diluted with xylene to obtain an alkyd resin varnish having a solid content 70% and Gardner viscosity Z.

REFERENCE EXAMPLE 5

Preparation of polyester resin varnish:

Into a reaction vessel fitted with stirrer, thermoregulator and decanter, were placed the following, which was stirred and heated.

| | |
|---|---|
| ethylene glycol | 39 parts |
| neopentyl glycol | 130 parts |
| azelaic acid | 236 parts |
| phthalic anhydride | 186 parts |
| xylene | 30 parts |

While removing the formed water azeotropically with xylene, the heating was continued until the acid value reached 150. At this point, the mixture was allowed to cool to 140° C., 314 parts of Cardura E-10 (epoxy resin manufactured by Shell Chem. Co.) was added and the mixture was stirred for 2 hours. The thus obtained resin had an acid value of 9, hydroxyl number of 90 and a number-average molecular weight of 1050. This was diluted with xylene to obtain a polyester resin varnish having a solid content 60% and Gardner viscosity Y.

EXAMPLE 1 AND COMPARATIVE EXAMPLE 1

Into a stainless steel vessel, were weighed the following and the content was mixed well by using a laboratory mixer to prepare a coating composition.

| component | Example 1 | Comp. Exam. 1 |
|---|---|---|
| polymer microparticles of Ref. Exam. 1 | 25 parts | — |
| acrylic resin varnish of Ref. Exam. 3 | 500 parts | 500 parts |
| n-butanol modified melamine resin | 65 parts | 65 parts |

When diluted with xylene/ethylene glycol monobutyl ether=1/1 to a Ford cup No. 4 viscosity of 25 seconds, the non-volatile (solid) content of the present composition was 39.6%, whereas the corresponding value of Comparative Example 1 was 37.6%. In the present coating composition, the sagging property in spray coating was greatly improved as compared with that of the Comparative coating composition.

EXAMPLE 2 AND COMPARATIVE EXAMPLE 2

Using the same procedures as stated in Example 1, the coating compositions were prepared with the following materials:

| component | Example 2 | Comp. Exam. 2 |
|---|---|---|
| polymer microparticles of Ref. Exam. 2 | 5 parts | — |
| aluminum paste* | 13 parts | 13 parts |
| acrylic resin varnish of Ref. Exam. 3 | 200 parts | 200 parts |

*composition of 64% aluminum flake, 1% stearic acid, and 35% mineral spirit

The respective composition was diluted with xylene/ethyleneglycol monobutyl ether=1/1 to a Ford cup No. 4 viscosity of 20 seconds. When coated by means of a spray gun, the present coating composition was far superior to the Comparative composition in regards of film performance such as pinhole and sagging properties and metal orientation.

EXAMPLE 3 AND COMPARATIVE EXAMPLE 3

100 parts of alkyd resin varnish of Reference Example 4 and 100 parts of Rutile type titanium dioxide were weighed in a vessel and stirred well by using a paint conditioner to obtain a white colored paste. Using this paste, the coating compositions were prepared as follows:

| component | Example 3 | Comp. Exam. 3 |
|---|---|---|
| polymer microparticles of Ref. Exam. 1 | 30 parts | — |
| white colored paste | 200 parts | 200 parts |
| hexamethoxymethyl melamine | 35 parts | 35 parts |
| p-toluene sulfonic acid | 0.1 part | 0.1 part |

The respective composition was diluted with xylene/ethyleneglycol monobutyl ether=1/1 to give a Ford cup No. 4 viscosity of 25 seconds, and applied by means of conventional spray coating (constant speed and interval) and thereafter baked at 140° C. for 30 minutes. A coating of 48μ dry thickness was obtained with the present coating composition, whereas a coating of 34μ with the Comparative coating composition.

EXAMPLE 4 AND COMPARATIVE EXAMPLE 4

100 parts of polyester resin varnish of Reference Example 5 and 90 parts of Rutile type titanium dioxide were weighed in a vessel and stirred well by using a paint conditioner to obtain a white colored paste. White colored coating compositions were prepared by placing in a vessel the following components and mixing by means of laboratory mixer at a room temperature for 30 minutes.

| component | Example 4 | Comp. Exam. 4 |
|---|---|---|
| polymer microparticles of Ref. Exam. 1 | 7 parts | — |
| white colored paste | 190 parts | 190 parts |
| trimer of hexamethylenediisocyanate | 5 parts | 5 parts |

The respective composition was diluted with a thinner of xylene/butyl acetate=1/1 to give a Ford cup No. 4 viscosity of 25 seconds, applied by means of spray coating and dried at 80° C. for 30 minutes. The present coating composition showed far more excellent film performance as to pinhole and sagging properties and gave a far thicker coating as compared with the Comparative composition.

REFERENCE EXAMPLE 6

Preparation of polyester resin having both amphoionic group and polymerizable α,β-unsaturated bonding:

Into a 2 liter flask equipped with stirrer, nitrogen inlet tube, thermoregulator, condenser and decanter, were placed 213 parts of bishydroxyethyl taurine, 236 parts of 1,6-hexanediol, 296 parts of phthalic anhydride, 376 parts of azelaic acid and 44 parts of xylene, and the mixture was heated, while removing the formed water azeotropically with xylene. The temperature reached 210° C. in about 3 hours from the commencement of reflux and the reaction was continued under stirring and dehydration until the acid value reached to 125. After cooling to 140° C., 250 parts of Cardura E-10 (glycidyl ester of versatic acid, manufactured by Shell Chem. Co.) were dropwisely added, while maintaining the same temperature, in 30 minutes and thereafter, stirring was continued for about 2 hours. The reaction mixture was then cooled to 80° C., added with 0.05 part of hydroquinone monomethyl ether, 140 parts of xylene, 170 parts of glycidyl methacrylate and 7.5 parts of triethylamine, and reacted at 90° C. for 3 hours. Thus obtained resin had an acid value of 53, hydroxyl number of 73, number-average molecular weight of 1110 and sulfur value of 21.9.

REFERENCE EXAMPLE 7

Preparation of polymer microparticles:

Into a reaction vessel equipped with stirrer, condenser and thermoregulator, were placed 25 parts of polyester resin obtained in Reference Example 6, 1.7 parts of dimethylethanolamine and 508 parts of deionized water, and the mixture was heated, while stirring, to 80° C. To this, 90 parts of the following initiator solution were added and immediately thereafter, dropwise addition of the following monomer mixture was started.

| Initiator solution | |
|---|---|
| azobiscyanovalerie | 10 parts |
| deionized water | 100 parts |
| dimethylethanolamine | 10 parts |
| Monomer mixture | |
| methyl methacrylate | 125 parts |
| n-butyl acrylate | 165 parts |
| styrene | 125 parts |
| 2-hydroxyethyl acrylate | 50 parts |
| ethyleneglycol dimethacrylate | 10 parts |

After finishing said addition in 60 minutes, the remaining 30 parts of said initiator solution were added and stirring was continued for additional 30 minutes. Thus obtained emulsion contained microgel dispersed phase, an average diameter (measured by transmission type electron microscope) of which was 0.083μ. The emulsion was then subjected to spray drying to obtain polymer microparticles.

REFERENCE EXAMPLE 8

Preparation of polymer microparticles:

Into the same reaction vessel as stated in Reference Example 7, were placed 100 parts of polyester resin obtained in Reference Example 6, 6.8 parts of dimethylethanolamine and 503 parts of deionized water, and the mixture was heated, while stirring, to 80° C. To this, 72 parts of the following initiator solution were added and immediately thereafter dropwise addition of the following monomer mixture was started.

| Initiator solution | |
|---|---|
| azobiscyanovaleric | 8 parts |
| deionized water | 80 parts |
| dimethylethanolamine | 8 parts |
| Monomer mixture | |
| methyl methacrylate | 80 parts |
| n-butyl acrylate | 130 parts |
| styrene | 80 parts |
| 2-hydroxyethyl acrylate | 50 parts |
| glycidyl methacrylate | 18.5 parts |
| methacrylic acid | 11.5 parts |

After completion of said addition in 2 hours, the remaining 24 parts of the initiator solution were added and the reaction was further continued for 30 minutes under stirring. The thus obtained emulsion contained a microgel dispersed phase, an average diameter of which was 0.042μ. The emulsion was then subjected to spray drying to obtain polymer microparticles.

EXAMPLE 5 AND COMPARATIVE EXAMPLE 5

Into a stainless steel vessel, the following were weighed and stirred well by means of laboratory mixer to obtain the respective coating composition.

| component | Example 5 | Comp. Exam. 5 |
|---|---|---|
| polymer microparticles of Ref. Exam. 7 | 25 parts | — |
| acrylic resin varnish of Ref. Exam. 3 | 500 parts | 500 parts |
| n-butanol modified melamine resin | 65 parts | 65 parts |

No sedimentation was observed for the microparticles dispersed in the composition of Example 5 even keep left for 72 hours. When the respective composition was diluted with xylene/ethyleneglycol monobutyl ether=1/1 so as to give a Ford cup No. 4 viscosity of 25 seconds, the solid content of the present composition was 42.3%, whereas the solid content of the Comparative Example 5 was 37.6%. Furthermore, the present composition showed far better sagging properties in spray coating than that of the comparative composition.

EXAMPLE 6 AND COMPARATIVE EXAMPLE 6

Using the same procedures as stated in Example 5, the following compositions were prepared.

| component | Example 6 | Comp. Exam. 6 |
|---|---|---|
| polymer microparticles of Ref. Exam. 8 | 5 parts | — |
| aluminum paste* | 13 parts | 13 parts |
| acrylic resin varnish of Ref. Exam. 3 | 200 parts | 200 parts |

*composition consisting of 64% aluminum flake, 1% stearic acid and 35% mineral spirit The respective composition was diluted with a mixture of xylene/ethyleneglycol monobutylether=1/1 to adjust the viscosity to 20 seconds measured by Ford cup No. 4. When applied by means of spray gun, the present composition showed far better results in respect of pinhole and sagging properties and control of metal pattern as compared with those of the comparative composition.

EXAMPLE 7 AND COMPARATIVE EXAMPLE 7

100 parts of alkyd resin varnish of Reference Example 4 and 100 parts of Rutile type titanium dioxide were weighed in a dispersion vessel and stirred well by means of paint conditioner to obtain a white colored paste. Using this paste and according to the following prescription, coating compositions were prepared.

| component | Example 7 | Comp. Exam. 7 |
|---|---|---|
| polymer microparticles of Ref. Exam. 7 | 30 parts | — |
| white colored paste | 200 parts | 200 parts |
| hexamethoxymethyl melamine | 35 parts | 35 parts |
| p-toluene sulfonic acid | 0.1 part | 0.1 part |

The respective composition was adjusted to the viscosity of 25 seconds measured by Ford cup No. 4, and applied by means of spray coating (same speed and same interval) and thereafter baked at 140° C. for 30 minutes. The thickness of the film of the present coating composition was 47μ, whereas the thickness of the film of the Comparative composition was 34μ.

EXAMPLE 8 AND COMPARATIVE EXAMPLE 8

100 parts of polyester resin varnish of Reference Example 5 and 90 parts of Rutile type titanium dioxide were weighed in a dispersion vessel, and stirred well by means of paint conditioner to obtain a white colored paste. Using this paste, the following coating compositions were prepared.

| component | Example 8 | Comp. Exam. 8 |
|---|---|---|
| polymer microparticles of Ref. Exam. 8 | 7 parts | — |
| white colored paste | 190 parts | 190 parts |
| trimer of hexamethylenediisocyanate | 5 parts | 5 parts |

The respective coating composition was diluted with xylene/butylacetate=1/1 to adjust the viscosity to 25 seconds measured by Ford Cup No. 4. Coating films were prepared by spraying the abovesaid composition and baked at 80° C. for 30 minutes. In respect of pinhole and sagging properties and film thickness of the coating, the present composition showed far more excellent effects than those of the Comparative composition.

What is claimed is:

1. In a high solid coating composition comprising
   (A) a film-forming polymer having functional group(s) capable of reacting with the crosslinking agent (D) hereinafter referred to,
   (B) a volatile organic liquid diluent in which the polymer (A) is carried,
   (C) polymer microparticles having an average diameter of from 0.02 to 40 microns, which are insoluble in the combination of the film-forming polymer (A) and the diluent (B) and are maintained in a stabilized state of dispersion therein, and
   (D) a crosslinking agent dissolved in the diluent (B), the improvement wherein the microparticles (C) are composed of a crosslinked copolymer comprising α,β-ethylenically unsaturated monomers and a crosslinking monomer which is at least difunctional,
   said copolymer having physically adhered or covalently bonded thereto a resinous portion having an amphoionic group of the formula:

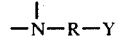

wherein R is a member selected from substituted or unsubstituted alkylene having 1 to 6 carbon atoms and phenylene and Y is —COOH or —SO$_3$H, said resinous portion being selected from the group consisting of alkyd, modified epoxy, acrylic, polyester and melamine resins.

2. The composition according to claim 1 wherein said resinous portion having an amphoionic group is physically adhered to said copolymer.

3. The composition according to claim 1 wherein said resinous portion having an amphoionic group is adhered to said copolymer by covalent bonding.

* * * * *